US012731083B2

(12) United States Patent
Yang et al.

(10) Patent No.: US 12,731,083 B2
(45) Date of Patent: Sep. 8, 2026

(54) METHOD AND APPARATUS FOR TRAINING SVM MODEL, DEVICE AND COMPUTER-READABLE STORAGE MEDIUM

(71) Applicant: PEKING UNIVERSITY, Beijing (CN)

(72) Inventors: Chao Yang, Beijing (CN); Ruibo Fan, Beijing (CN); Yulong Ao, Beijing (CN); Min Li, Beijing (CN); Kesen Li, Beijing (CN)

(73) Assignee: PEKING UNIVERSITY, Beijing (CN)

( * ) Notice: Subject to any disclaimer, the term of this patent is extended or adjusted under 35 U.S.C. 154(b) by 340 days.

(21) Appl. No.: 18/026,867

(22) PCT Filed: Mar. 4, 2022

(86) PCT No.: PCT/CN2022/079312
§ 371 (c)(1),
(2) Date: Mar. 17, 2023

(87) PCT Pub. No.: WO2022/188711
PCT Pub. Date: Sep. 5, 2022

(65) Prior Publication Data

US 2024/0028970 A1 Jan. 25, 2024

(30) Foreign Application Priority Data

Mar. 12, 2021 (CN) ......................... 202110270550.5

(51) Int. Cl.
*G06N 20/10* (2019.01)

(52) U.S. Cl.
CPC .................................... *G06N 20/10* (2019.01)

(58) Field of Classification Search
CPC ...................................................... G06N 20/10
See application file for complete search history.

(56) References Cited

U.S. PATENT DOCUMENTS

2009/0132446 A1* 5/2009 Milenova .............. G06F 16/284 706/14
2009/0304268 A1* 12/2009 Cadambi ................ G06N 20/10 382/181
2019/0278600 A1 9/2019 Frumkin et al.

FOREIGN PATENT DOCUMENTS

CN 103984527 A 8/2014
CN 108280514 A 7/2018
(Continued)

OTHER PUBLICATIONS

A hybrid computing method of SpMV on CPU-GPU heterogeneous computing systems. Wangdong Yanga et al. (Year: 2017).*
(Continued)

*Primary Examiner* — Hosain T Alam
(74) *Attorney, Agent, or Firm* — IPro, PLLC

(57) ABSTRACT

The embodiments of the present disclosure provide a method and apparatus for training an SVM model, a device and a computer-readable storage medium. The method comprises steps of: acquiring a dataset; loading the dataset; predicting the best storage format of the dataset online through an automatic tuning framework, and performing format conversion; and, executing an SMO algorithm to train an SVM model. In this way, the best data storage format and algorithm can be automatically selected according to the input dataset; in a global loop level, a large number of more efficient matrix multiplication operations are performed on the basis of the best data storage format to calculate a kernel matrix; and, in a local SMO solver level, finer memory optimization is performed by the register communication technology and the combined memory access method of the GPU, and the calculation resources of the hardware platform are fully utilized.

5 Claims, 5 Drawing Sheets

(56) References Cited

FOREIGN PATENT DOCUMENTS

| | | |
|---|---|---|
| CN | 109416687 A | 3/2019 |
| CN | 111241056 A | 6/2020 |
| CN | 112329822 A | 2/2021 |
| CN | 112380003 A | 2/2021 |
| CN | 112529157 A | 3/2021 |
| CN | 112686342 A | 4/2021 |

OTHER PUBLICATIONS

SMAT: An Input Adaptive Sparse Matrix-Vector Multiplication Auto-Tuner. Jiajia Li et al. (Year: 2012).*

ThunderSVM: A Fast SVM Library on GPUs and CPUs. Wen et al. (Year: 2018).*

GPU-Based Parallel Machine Learning Algorithms in Automated Machine Learning Frameworks. A. E. Bank (Year: 2019).*

Design and Implementation of Adaptive SpMV Library for Multicore and Many-Core Architecture. By Tan et al. (Year: 2018).*

Li, Min; Ao, Yulong; Yang, Chao, "Adaptive SpMV/SpMSpV on GPUs for Input Vectors of Varied Sparsity," IEEE Transactions on Parallel and Distributed Systems, pp. 1-1 (2020). DOI: 10.1109/tpds.2020.3040150.

Chen, Shizhao, et al. "Optimizing sparse matrix-vector multiplication on emerging many-core architectures." arXiv preprint arXiv:1805.11938 (2018).

Shi Jiashuai. "ThunderSVM: A Fast Parallel Support Vector Machine Library." A Master's degree dissertation. South China University of Technology. Apr. 2019.

Jiajia Li, et al. "Study of Choosing the Optimal Storage Format of Sparse Matrix Vector Multiplication." Journal of Computer Research fnd Development. 51(4):882-894. 2014.

Wang Yu. "The Automatic Generation System of the Parallel PCG Method Based on CUDA." A Master's degree dissertation. Zhejiang University of Technology. Mar. 2017.

Li, T., et al. "Parallel support vector machine training with hybrid programming model." J. Comput. Res. Dev 52 (2015): 1098-1108.

* cited by examiner

METHOD AND APPARATUS FOR TRAINING SVM MODEL, DEVICE AND COMPUTER-READABLE STORAGE MEDIUM

TECHNICAL FIELD

The embodiments of the present disclosure generally relate to the technical field of machine learning, more particularly to a method and apparatus for training a support vector machine (SVM) model, a device and a computer-readable storage medium.

BACKGROUND

As one of the commonly used machine learning algorithms, SVM has been widely applied in various scientific fields, such as handwritten digit identification, object identification and voice identification in the pattern identification field, image classification and pedestrian detection in the computer vision field or the like. The SVM obtains the best hyperplane by maximizing the inter-class interval in the feature space, and has the advantages of high accuracy, good generalization performance, strict mathematical justification or the like. The SVM is originally proposed to solve linear separable dichotomization problems, but the kernel method makes it possible to handle nonlinear separable problems. LibSVM, as an open source toolkit, has been widely applied in many scenarios, and has become the most popular SVM toolkit because of its easy-to-use interfaces and comprehensive functions. However, due to the increasing data size in the era of big data, it takes more and more time for the LibSVM to train the SVM model, which greatly limits the application of the SVM algorithm. The main reason why the SVM training process is very time-consuming is that lots of iteration steps are required to solve the OP optimization problem and that matrix vector multiplication are performed two times during each iteration. Thus, this process is very time-consuming.

As one non-negligible trend, the calculation industry is developing toward the parallel calculation direction. Meanwhile, the GPU, as an excellent calculation platform, is widely applied in many calculation-intensive scenarios such as accelerated calculation of deep learning and atmospheric simulation.

At present, there have been some parallel SVM algorithms based on the GPU platform. One algorithm is GPUSVM, and the other algorithm is ThunderSVM.

The GPUSVM adopts an SMO algorithm as the solution algorithm. The SMO algorithm is an iteration algorithm, and each iteration is divided into three main steps. First, two most extreme Lagrange multipliers are found by a first or second heuristic method; then, the two multipliers are optimized; and, all gradient vectors f are updated. In the first step, the GPUSVM adopts an adaptive method instead of a single heuristic method, to realize a switchover between the first heuristic method and the second heuristic method so as to achieve faster convergence speed. In the third step, since the updating of gradient vectors f needs to access two rows in the kernel matrix corresponding to the Lagrange multipliers selected in this iteration, the GPUSVM calculates all kernel matrices in advance by one matrix-matrix multiplication before the beginning of iteration and stores the kernel matrices in a global memory of the GPR. Thus, the strong parallel calculation capability of the GPU can be fully utilized. The GPUSVM adopts a dense data format as the storage format and calls itself to realize the matrix-matrix multiplication algorithm, but does not adopt the cuBLAS library that is widely used at present.

The ThunderSVM also adopts the SMO algorithm as the internal solution algorithm. However, unlike GPUSVM, it adopts a hierarchical decomposition method. The loop iteration of the original SMO algorithm is split into two-level loops, i.e., a global loop level and a local solver level. Each global loop selects the current working set for the local solver, and the local solver is responsible for solving the working set by the SMO algorithm. In the global loop level, multiple pairs of relatively extreme Lagrange multipliers by using the first heuristic method for multiple times to form the current working set; and in the first step of the SMO algorithm of the local solver, extreme Lagrange multipliers in the current working set are selected by the second heuristic method. In addition, the local solver of the ThunderSVM is efficiently executed on a CUDA thread block, so the characteristic of the CUDA shared memory are fully utilized and the memory access time is reduced. Some of the kernel matrices that may be accessed by the SMO algorithm of the local resolver are also calculated in each global loop and stored in the global memory for access by the local solver. The ThunderSVM adopts a CSR sparse storage format, and calls the cuSPARSE library for matrix multiplication operation.

During the implementation of the GPUSVM, kernel matrices are calculated at one time by its own dense matrix multiplication algorithm and then stored in the global memory of the GPU. Although the parallel calculation performance of the GPU is well exerted in this method, the efficiency of the dense matrix multiplication algorithm implemented by this method is lower than that of the GEMM algorithm implemented in the cuBLAS library that is widely used at present. In addition to the low matrix multiplication efficiency of calculating kernel matrices, the calculation of kernel matrices at one time will cause storage problems. If it is assumed that the data size is num*dim, the size of kernel matrices is num*num and increases rapidly with the increase of the size of the sample dataset, and the space requirement for storage of all kernel matrix is also increasing rapidly. However, the global memory of the GPU is limited, and it is unable for the GPUSVM to correctly process large-scale datasets.

The two-level loop method is used during the implementation of the ThunderSVM. Only the local kernel matrix of the current working set size need to be calculated and stored in each global iteration, thereby avoiding the problem of storing all kernel matrices. However, since the CSR format is used as the fixed storage format, although the SpMM sparse matrix multipliers in the cuSPARSE are called for the calculation of local kernel matrices, the parallel calculation capability of the GPU cannot be fully exerted, and it is unable to adapt to all datasets. In addition, during the implementation of the SMO solver in the local level of the ThunderSVM, although the Lagrange multiplier vectors a and gradient vectors f accessed at a high frequency are stored in the shared memory, the implementation of the most time-consuming steps 1 and 3 in the SMO iteration is not efficient. Moreover, in the process of updating the gradient vectors fin the step 3, two rows of kernel matrices in the global memory accessed by threads are not accessed in combination, so that the memory access efficiency is reduced.

The calculation of kernel matrices depends on the matrix multiplication, which is often the bottleneck of the whole SVM algorithm due to high calculation intensity and high time consumption. The storage format of the dataset will directly affect the efficiency of subsequent matrix multiplication. The dense format has good memory access efficiency, but will cause redundant operations to sparse datasets; while the sparse format will reduce the memory access efficiency, but will not cause redundant operations. The common disadvantage of the GPUSVM and the ThunderSVM is the use of the fixed storage format. The GPUSVM adopts the dense format, while the ThunderSVM adopts the CSR format, so that the both cannot be suitable for all datasets.

SUMMARY

In accordance with the embodiments of the present disclosure, a scheme for training an SVM model is provided.

In a first aspect of the present disclosure, a method for training an SVM model is provided. The method includes steps of: acquiring a dataset, the number of samples in the dataset being n, the dimensionality being d, both n and d being positive integers greater than 1; loading the dataset; predicting the best storage format of the dataset online through an automatic tuning framework and performing format conversion; and, executing an SMO algorithm to train an SVM model.

In a second aspect of the present disclosure, an identification method based on an SVM model is provided. The method comprises steps of: acquiring a dataset to be identified; loading the dataset to be identified; predicting the best storage format of the dataset online through an automatic tuning framework, and performing format conversion; and, identifying the dataset according to the SVM model.

In a third aspect of the present disclosure, an apparatus for training an SVM model is provided. The apparatus includes: a dataset acquisition module configured to acquire a dataset, the number of samples in the dataset being n, the dimensionality being d, both n and d being positive integers greater than 1; a dataset loading module configured to load the dataset and to predict the best storage format of the dataset online through an automatic tuning framework and perform format conversion; and, an SVM model training module configured to execute an SMO algorithm to train an SVM model.

In a fourth aspect of the present disclosure, an electronic device is provided. The electronic device includes: a memory and a processor, wherein the memory stores computer programs, and the processor implements the method described above when executing the programs.

In a fifth aspect of the present application, a computer-readable storage medium is provided, the computer-readable storage medium storing computer programs that, when executed by a processor, implement the method according to the first aspect of the present disclosure.

It should be understood that the content disclosed in the SUMMARY is not intended to limit the crucial or important features of the embodiments of the present disclosure and also not intended to limit the scope of the present disclosure. Other features of the present disclosure will become apparent from the following description.

BRIEF DESCRIPTION OF THE DRAWINGS

The above and other features, advantages and aspects of the embodiments of the present disclosure will become more apparent with reference to the accompanying drawings and the following detailed description. Throughout the accompanying drawings, like or similar reference numerals indicate like or similar elements, in which.

DETAILED DESCRIPTION

To make the objectives, technical solutions and advantages of the embodiments of the present disclosure clearer, the technical solutions in the embodiments of the present disclosure will be described clearly and completely with reference to the accompanying drawings in the embodiments of the present disclosure. Apparently, the described embodiments are some but not all of the embodiments of the present disclosure. All other embodiments obtained by a person of ordinary skill in the art without paying any creative effort on the basis of the embodiments in the present disclosure shall fall into the protection scope of the present disclosure.

In addition, as used herein, the term "and/or" is merely an association relation describing associated objects, and means that there may be three relations. For example, A and/or B may indicate the following three situations: there exists A alone; there exist both A and B; and, there exists B alone. In addition, as used herein, the character "/" generally indicates that there is an "OR" relationship between associated objects.

Figure 1:
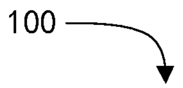
FIG. 1 shows a flowchart of a method for training an SVM model according to an embodiment of the present disclosure.
Figure 1:
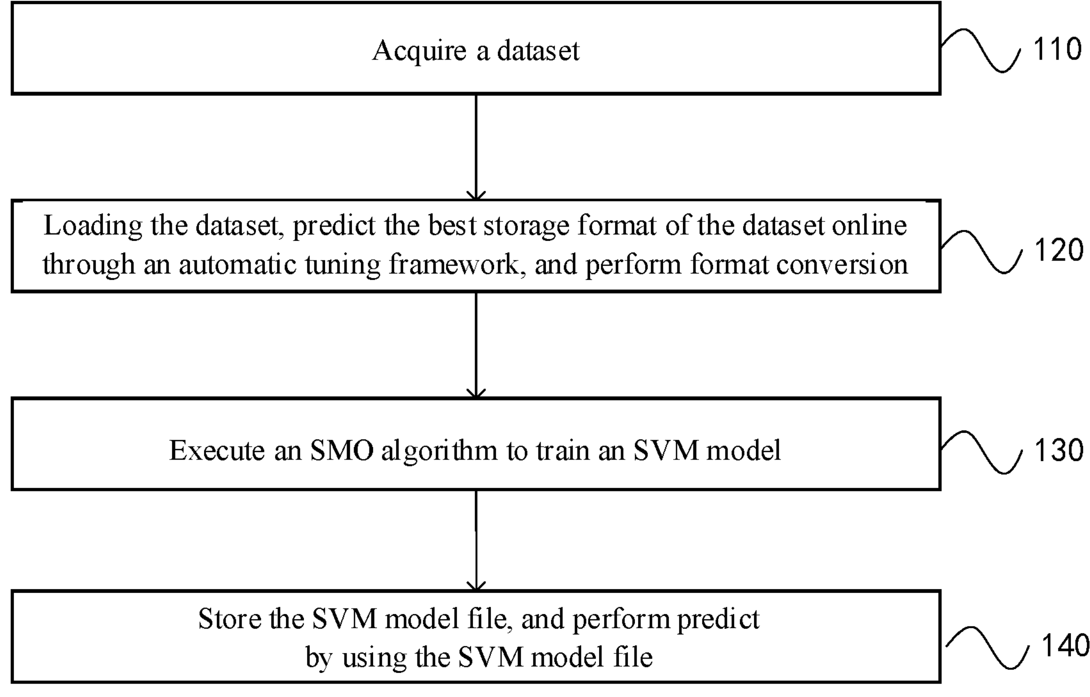
Figure 2:
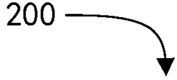
FIG. 2 shows a flowchart of a method for training a decision tree model according to an embodiment of the present disclosure.
Figure 2:
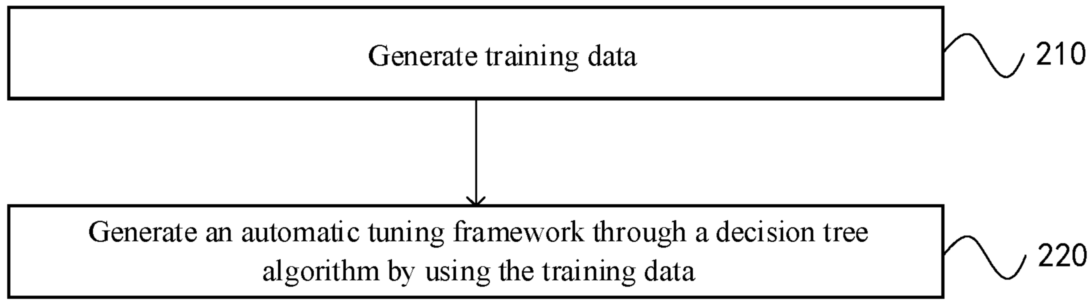
Figure 3:
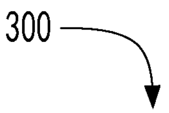
FIG. 3 shows a flowchart of a method of executing an SMO algorithm to train an SVM model according to an embodiment of the present disclosure.
Figure 3:
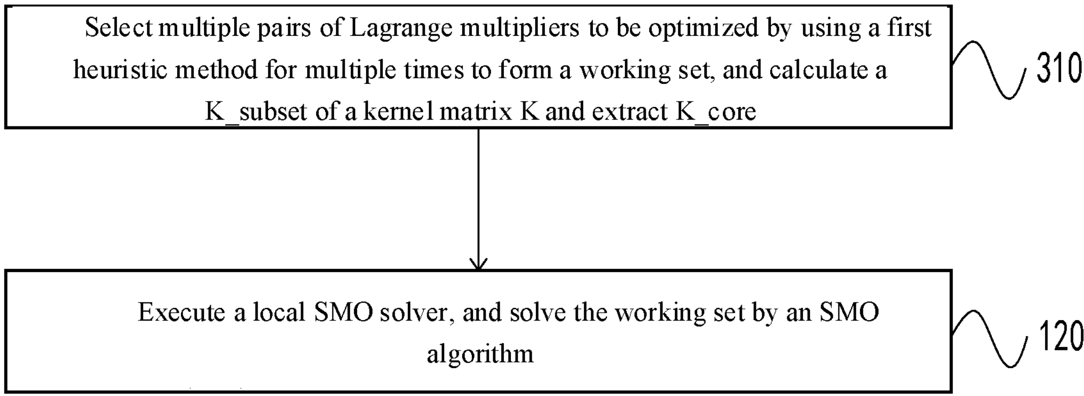

FIG. 1 shows a flowchart of a method 100 for training an SVM model according to an embodiment of the present disclosure. As shown in FIG. 1, the method includes the following steps.

At block 110, a dataset is acquired.

In some embodiments, the dataset is handwriting, voice and image training samples.

In some embodiments, the dataset is Dataset, the number of samples in the dataset is n, and the dimensionality is d, where both n and d are positive integers greater than 1. The training samples further include labels for labeling the samples.

At block 120, the dataset is located, the best storage format of the dataset is predicted online through an automatic tuning framework, and a format conversion is performed.

In some embodiments, the loading the dataset includes: reading and loading the dataset into a CPU memory, and storing the dataset as a dataset matrix M in a CSR format. The shape of the dataset matrix M is n*d.

In some embodiments, the data is read and loaded by OpenMP multithreading.

In some embodiments, the prediction of the best storage format for the dataset online is achieved by implementing an automatic tuning framework and performing format conversion includes:

calculating feature parameters of the dataset in parallel on a GPU;

inputting the feature parameters into a decision tree model on a CPU to predict the best storage format of the dataset; and determining whether the best storage format is the same as the current storage format CSR; converting the current storage format into the best storage format on the GPU if the best storage format is not the same as the current storage format CSR; and, not performing format conversion if the best storage format is the same as the current storage format CSR.

In some embodiments, the best storage format of the dataset may be any one of a dense format (cuBLAS GEMM), a CSR format (cuSPARSE SpMM) and an ellpack-R(Ell SpMM) format. For example, the dense format has good memory access efficiency, and the CSR format has no redundant operations for sparse datasets. Through format conversion, the disadvantages of single data format and low parallel efficiency of the previous SVM implementation are solved, and the efficiency of matrix multiplication in subsequent training steps of the SVM can be greatly improved.

As the additional overhead of the automatic tuning framework, the above steps refer to extra operations in the online prediction process compared with the original SVM algorithm process, and mainly include the following parts: 1. the calculation of feature parameters of the dataset; 2. The prediction of the best storage format using the decision tree model; and, 3. the time of storage format conversion. The calculation of the feature parameters of the dataset is executed in parallel on the GPU with the format conversion, and may be executed by high-efficiency parallel kernels. By adopting the GPU parallel strategy, the additional overhead caused by the automatic tuning framework is greatly reduced. The prediction using the decision tree model is executed on the CPU, in case it contains mostly if-else branch statements which are not suitable for parallel execution on the GPU Moreover, since the prediction time for the decision tree algorithm is short, any special processing is not required.

In some embodiments, the decision tree model is trained offline by the following method 200.

At block 210, training data is generated.

In some embodiments, a dataset is generated, and feature set data of the dataset is calculated; and, the feature set data is used as the training data, wherein:

Firstly, a large number (1000+) of datasets are randomly generated.

Then, the feature set data of each dataset is calculated. The data structure of the feature set data is as follows: {BEST Format, n, d, nnz, nnz_ratio, nnz_max, nnz_min, nnz_average, nnz_variance}, where Best Format is a method (e.g., cuBLAS GEMM) in the method space, and is the best storage format obtained by tests and regarded as a label, and the other eight parameters are the feature parameters of the dataset. One piece of feature set data is calculated for each of the randomly generated datasets.

Finally, the feature set data of all datasets is used as the training data of the automatic tuning framework.

At block 220, the automatic tuning formwork is generated through a decision tree algorithm by using the training data.

The use of the decision tree algorithm as the classification algorithm has the advantages of short prediction time and high interpretability.

At block 130, an SMO algorithm is executed to train an SVM model.

The kernel matrix required by the SMO algorithm is denoted as a kernel matrix K and has a shape of n*n. The $i^{th}$ row of the kernel matrix K is denoted by a symbol $K_i$. In the SMO algorithm, the Lagrange multiplier vector is defined as $\alpha$, the gradient vector is defined as f, and the both have a size of n. The $i^{th}$ elements in the two vectors are denoted by a(i) and f(i), where i is called a subscript.

In some embodiments, the method 300 of executing the SMO algorithm to train the SVM model includes the following steps.

At block 310, on the global level, multiple pairs of Lagrange multipliers to be optimized are selected in the GPU by using a first heuristic method for multiple times to form a working set; a K_subset of a kernel matrix K is calculated and K_core is extracted.

In some embodiments, the multiple pairs of Lagrange multipliers to be optimized and their subscripts are collectively called a working set, and it is appointed that the size of the working set is ws_size. In some embodiments, the working set having a size of 1024, i.e., 512 pairs of Lagrange multipliers, is selected.

In some embodiments, it is appointed that some rows of the kernel matrix K and the dataset matrix M are called their sub-matrices, which are denoted by symbolK_subset and M_subset, respectively.

In some embodiments, calculating some rows K_subset (ws_size*n) of the kernel matrix K includes: selecting subscripts (total ws_size subscripts) of multipliers in the working set, and extracting corresponding rows from the dataset matrix M(n*d) to form a M_subset(ws_size*d); and, calculating K_subset(ws_size*n) by the formula K_subset=M_subset×M'. The ws_size is the size of the working set, and M' is an inverse matrix of M. In this step, matrix multiplication in ws_size*d×d*n needs to be performed for one time, so it is very time-consuming when the size of the dataset is very large. In addition, generally, the number of loops of the global iteration also increases with the increase of the data size, which means that the matrix multiplication needs to be performed for multiple times. Therefore, this is the bottleneck of the whole SMO algorithm process. The block 320 of the present invention is to improve the efficiency of the matrix multiplication by selecting the best matrix format and algorithm.

Figure 7:
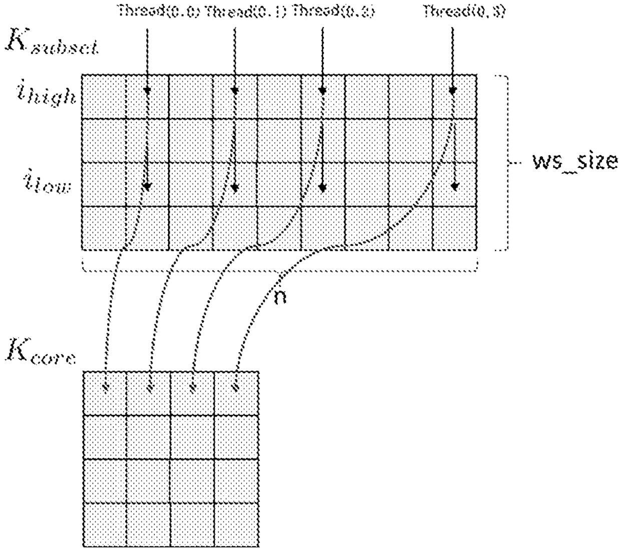
FIG. 7 shows a schematic diagram of extracting K_core in parallel according to an embodiment of the present disclosure.

In some embodiments, K_core(ws_size*ws_size) is extracted in parallel from the matrix K_subset(ws_size*n). As shown in FIG. 7, a two-dimensional thread grid of ws_size*ws_size is enabled, and the thread with a thread number (i,j) is responsible for reading data from K_subset(i, working_set(j)) and writing the data into K_core(i,j). For example, Thread(0,0) extracts data in the first row and second column of the K_subset(ws_size*n) and writes the data into K_core(0,0); Thread(0,1) extracts data in the first row and fourth column of the K_subset(ws_size*n) and writes the data into K_core(0,1); Thread(0,2) extracts data in the first row and sixth column of the K_subset(ws_size*n) and writes the data into K_core(0,2); and so on.

This step is helpful for the local solver at block 520 to realize the combined memory access, reduce the time delay and improve the memory access efficiency.

At block 320, a local SMO solver is executed. In the GPU, the working set is solved by using the SMO algorithm.

In some embodiments, the execution of the local SMO solver on the GPU is essentially the solution of the corresponding sub-problem in ws_size in the working set, and is efficiently performed on one CUDA thread block on the GPU. The algorithm of the local SMO solver is the same as the original SMO algorithm, which is an three-loop-steps iteration algorithm, including the following:

Step (a): Two extreme Lagrange multipliers α(high) and α(low) are found from the working set, where the subscripts are denoted by high and low, respectively.

Step (b): The α(high) and α(low) are updated.

Step (c): Gradient vectors corresponding to the subscripts in the working set are updated.

In some embodiments, since the local SMO solver performs lots of iterations, it is relatively time-consuming, and it is also a bottleneck of the algorithm process. In the embodiments of the present disclosure, the local SMO solver is optimized emphatically.

Figure 8:
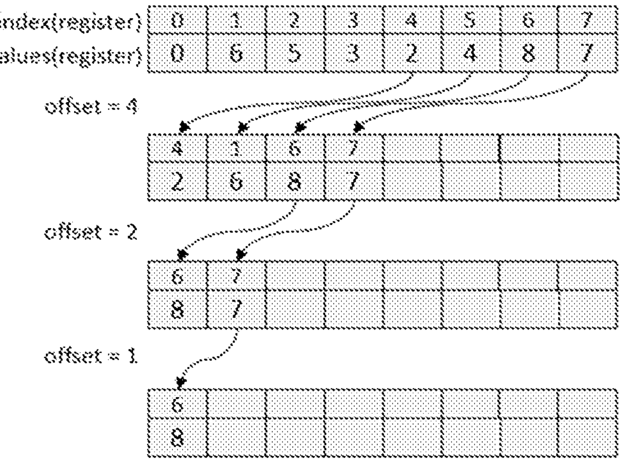
FIG. 8 shows a schematic diagram of finding two extreme Lagrange multipliers $\alpha$(high) and $\alpha$(low) from the working set according to an embodiment of the present disclosure.

For the step (a), this step finds labels with the maximum vector value by two protocol-appointed operations. An efficient parallel algorithm is designed on one CUDA thread block. As shown in FIG. 8, 1024 threads are enabled. The thread with a thread number i reads index(i) and values(i) into register variables index and values, and then uses the warp shuffle instruction of the CUDA to realize direct register communication between threads. Each thread in the same warp acquires the threads' index and values which are separated by offset. In the process of updating the values of this thread as the larger values of two threads, the index of this thread is also updated as the corresponding index. The warp shuffle instruction is more efficient than the shared memory, and two efficient parallel reduce operations are completed. As shown in FIG. 8, the index is updated as 6, and the values are updated as 8 at the end of the updating process.

For the step (c), the thread assigned with a thread number i updates f(working_set(i)) in the gradient vector. If there is no process of extracting K_core at block 310, it is necessary to assess K_subset(high, working_set(i)) and K_subset(low, working_set(i)). The required access of K_subset(high, working_set(i)) and K_subset(low, working_set(i)) violates the principle of combined memory access of the CUDA global memory and reduces the memory access efficiency. After the block 310 is introduced, the accessing process is changed to accessing K_core(high,i) and K_core(low,i), thereby realizing the combined memory access, and improving the memory access efficiency.

In the process of executing the local SMO solver, more detailed memory optimization is performed by using the register communication technology and the combined memory access method of the GPU, and the calculation resources of the hardware platform are fully utilized.

At block 330, a global gradient vector is updated.

In some embodiments, n threads are enabled, and the thread with a thread number i updates f(i).

At block 340, it is determined whether a convergence condition in a global level is satisfied; the training of the SVM mode is completed if the convergence condition in the global level is satisfied; and, iteration is performed and steps 310 to 330 are repeated if the convergence condition in the global level is not satisfied.

At block 140, the SVM model file is stored, and prediction is performed by the implementation of the SVM model file.

In some embodiments, the method further includes performing pattern identification by implementation of the SVM model file.

In accordance with the embodiment of the present disclosure, the following technical effects are achieved.

In this embodiment, an automatic tuning framework suitable for the SVM algorithm on the GPU is adopted, so that the disadvantages of single data format and low parallel efficiency of the previous SVM implementation are eliminated.

Overall, the original SVM algorithm process is decomposed and recombined into a two-level loop structure of global and local SMO solvers, and an automatic tuning framework is provided, so that the best combination of feature parameters can be quickly predicted in the online stage according to the input dataset. Thus, the best storage format is predicted, and the dataset is converted into the best storage format. In the global loop level, a large number of more efficient matrix multiplication operations are performed on the basis of the best data storage format to calculate a kernel matrix. In the local SMO solver level, finer memory optimization is performed by using the register communication technology and the combined memory access method of the GPU, and the calculation resources of the hardware platform are fully utilized.

In accordance with the method provided in the embodiment of the present disclosure, the defect that fixed data storage format can only adapt to some datasets during the implementations of the widely used LibSVm on CPU and ThunderSVM on GPU is overcame, and the defect that the hardware calculation resources of the GPU are not fully utilized during the implementations of both is also overcame. Thus, the calculation performance of the SVM algorithm is improved.

Compared with the LibSVM on the CPU and the ThunderSVM on the GPU, the method in the embodiment of the present disclosure has a higher acceleration ratio. On a particular test platform, for the LibSVM, the acceleration ratio has a minimum value of 123.49, a maximum value of 4167.98 and an average value of 868.2; while for the ThunderSVM, the acceleration ratio has a minimum value of 1.26, a maximum value of 8.65 and an average value of 2.93.

In some embodiments, the test platform is Intel Xeon E5-2643 V4, 256G, NVIDIA Tesla P100, 16G. The 10 datasets involved in the test are real datasets, all of which come from the LibSVM homepage. Table 1 shows the information of the 10 datasets. Table 2 shows the ratio of the additional overhead of the automatic tuning framework provided in the method according to the embodiment of the present disclosure. Table 3 shows the acceleration ratio of the method according to the embodiment of the present disclosure in comparison to LibSVM and ThunderSVM.

TABLE 1

Information of datasets

| Dataset | Quantity | Dimensionality | Penalty parameter C | Parameter gamma |
|---|---|---|---|---|
| a9a | 32561 | 123 | 4 | 0.5 |
| w8a | 49749 | 300 | 4 | 0.5 |
| skin_nonskin | 245057 | 3 | 4 | 0.5 |
| covtype | 581012 | 54 | 3 | 1 |
| rcv | 20242 | 47236 | 4 | 0.5 |
| real-sim | 72309 | 20958 | 4 | 0.5 |
| news20 | 19996 | 1355191 | 4 | 0.5 |
| epsilon-subset | 80000 | 2000 | 32 | 0.0001 |
| mnist.binary | 60000 | 10000 | 1 | 0.02 |
| cifar10 | 50000 | 3072 | 10 | 0.002 |

TABLE 2

| Overhead ratio of the automatic tuning framework | | | |
|---|---|---|---|
| Dataset | Training time | Overhead time | Overhead ratio |
| a9a | 1524.3 | 0.835168 | 0.05% |
| w8a | 2241.86 | 0.57472 | 0.03% |
| skin_nonskin | 12856.4 | 0.744864 | 0.01% |
| covtype | 71033.7 | 2.82672 | 0.00% |
| rcv | 763.986 | 0.581088 | 0.08% |
| real-sim | 2566.55 | 0.680288 | 0.03% |
| news20 | 4080.33 | 0.710176 | 0.02% |
| epsilon-subset | 4657.46 | 58.576828 | 1.26% |
| mnist.binary | 928.238 | 7.444092 | 0.80% |
| cifar10 | 18070.6 | 89.071508 | 0.49% |

TABLE 3

| Acceleration ratio | | | | | |
|---|---|---|---|---|---|
| Dataset | LibSVM (s) | Thunder SVM (ms) | The time of the present invention (ms) | Acceleration ratio (LibSVM) | Acceleration ratio (ThunderSVM) |
| a9a | 226.13 | 88.58 | 1525.14 | 148.27 | 1.60 |
| w8a | 408.83 | 200.73 | 2242.43 | 182.32 | 1.38 |
| skin_nonskin | 1587.75 | 1333.61 | 12857.14 | 123.49 | 1.71 |
| covtype | 11884.41 | 11165.48 | 71036.53 | 167.30 | 1.87 |
| rcv | 279.95 | 73.01 | 764.57 | 366.15 | 1.58 |
| real-sim | 1293.36 | 350.53 | 2567.23 | 503.80 | 1.26 |
| news20 | 1447.14 | 801.92 | 4081.04 | 354.60 | 2.07 |
| epsilon-sub | 19656.36 | 19911.37 | 4716.04 | 4167.98 | 8.65 |
| mnist.binary | 747.35 | 351.93 | 935.68 | 798.72 | 1.96 |
| cifar10 | 34022.42 | 7740.39 | 18159.67 | 1873.52 | 7.18 |

Figure 4:
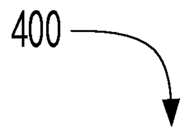
FIG. 4 shows a flowchart of an identification method based on SVM model according to an embodiment of the present disclosure.
Figure 4:
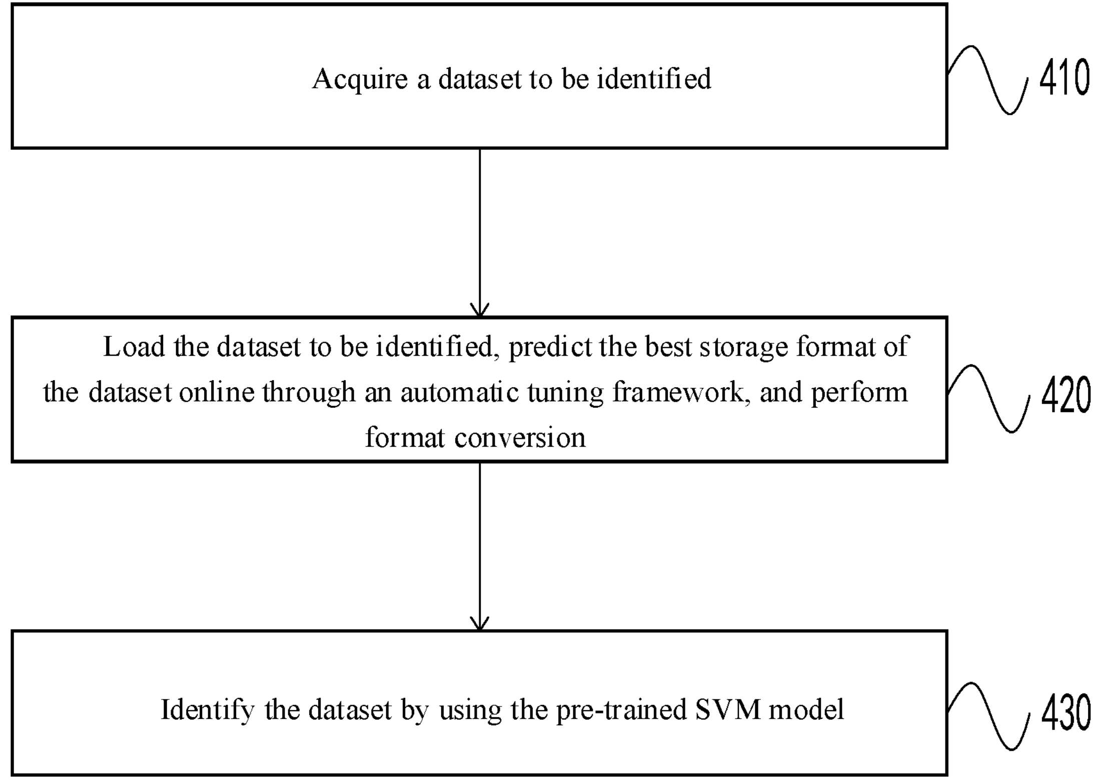

FIG. 4 shows a flowchart of an identification method 400 based on SVM model according to an embodiment of the present disclosure.

At block 410, a dataset to be identified is acquired.

In some embodiments, the dataset to be identified may be a dataset to be identified in fields such as handwritten digit identification, object identification, voice identification, image classification in the computer vision field, and pedestrian detection.

At block 420, the dataset to be identified is loaded, the best storage format of the dataset is predicted online through an automatic tuning formwork, and format conversion is performed.

At block 430, the dataset is identified according to the pre-trained SVM model.

In some embodiments, the pre-trained SVM model is trained by the method 100 for training an SVM model according to the embodiments of the present disclosure.

In accordance with the method provided in the embodiment of the present disclosure, the defect that fixed data storage format can only adapt to some datasets during the implementations of the widely used LibSVm on CPU and ThunderSVM on GPU is overcame, and the defect that the hardware calculation resources of the GPU are not fully utilized during the implementations of the both is also overcame. Thus, the calculation performance of the SVM algorithm is improved.

It is to be noted that, for simplicity of description, the above method embodiments are all described as a series of act combinations; however, it should be understood by those skilled in that the present disclosure is not limited to the described act order, because some steps may be performed in other orders or simultaneously according to the present disclosure. Next, it should be understood by those skilled in the art that the embodiments in this specification are all optional embodiments and the involved acts and modules are not necessary for the present disclosure.

The method embodiments have been described above, and the scheme of the present disclosure will be further described below by apparatus embodiments.

Figure 5:
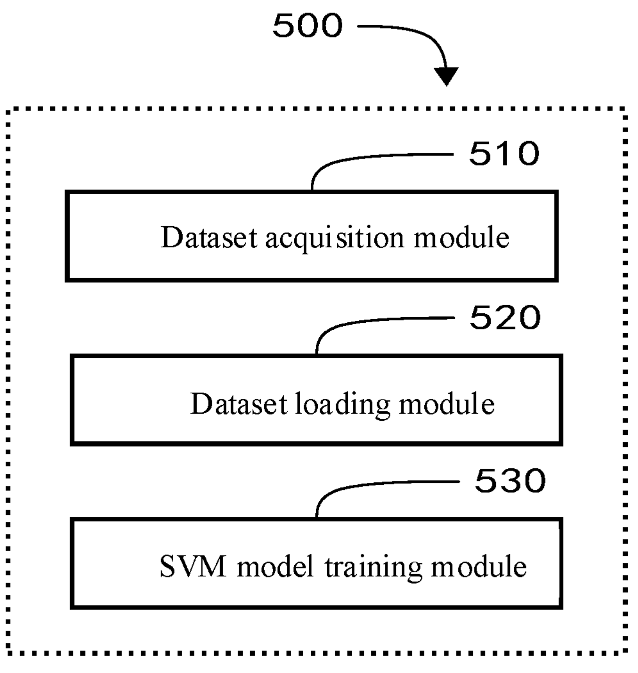
FIG. 5 shows a block diagram of an apparatus for training an SVM model according to an embodiment of the present disclosure.

FIG. 5 shows a block diagram of an apparatus 500 for training an SVM model according to an embodiment of the present disclosure. As shown in FIG. 5, the apparatus 500 includes:

a data set acquisition module 510 configured to acquire a dataset, the number of samples in the dataset being n, the dimensionality being d, both n and d being positive integers greater than 1;

a dataset loading module 520 configured to load the dataset, predicts the best storage format of the dataset online through an automatic tuning formwork and performs format conversion; and an SVM model training module 530 configured to execute an SMO algorithm to train an SVM model.

It should be clearly understood by those skilled in the art that, for convenience and conciseness of description, the specific operation processes of the des may refer to the corresponding processes in the above method embodiments and will not be repeated here.

Figure 6:
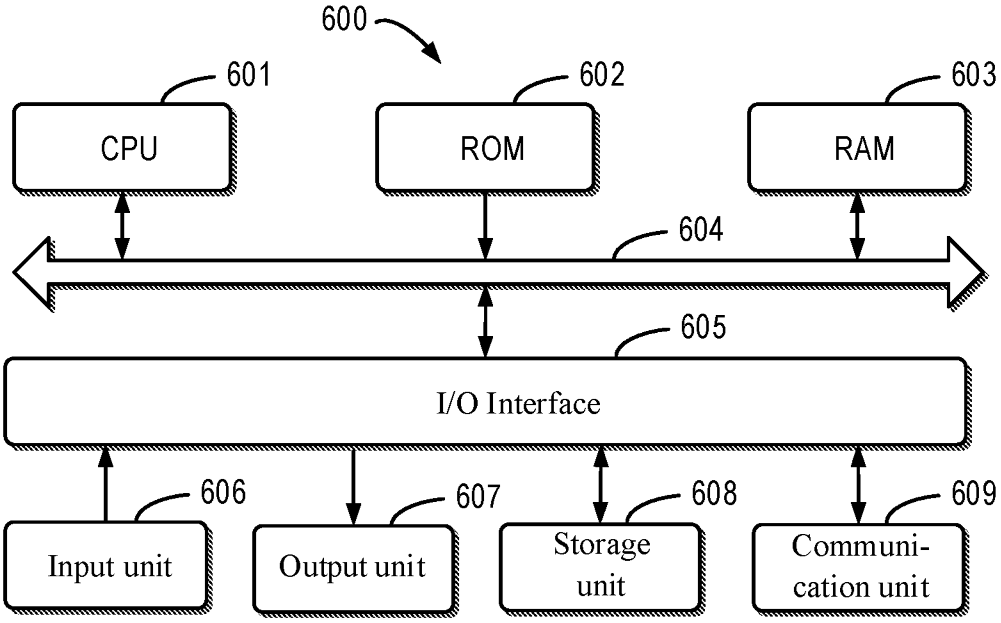
FIG. 6 shows a block diagram of an exemplary electronic device capable of implementing the embodiments of the present disclosure.

FIG. 6 shows a schematic block diagram of an electronic device 700 capable of implementing the embodiments of the present disclosure. The device 600 may be configured to implement the apparatus 500 for training an SVM model in FIG. 5. As shown, the device 600 includes a central processing unit (CPU) 601 which can execute various suitable acts and processing according to the computer program instructions stored in a read-only memory (ROM) 602 or computer program instructions loaded from a storage unit 608 to a random access memory (RAM) 603. The RAM 603 can also store various programs and data required for the operation of the device 600. The CPU 601, the ROM 602 and the RAM 603 are connected to each other via a bus 604. An input/output (I/O) interface 605 is also connected to the bus 604.

A plurality of components in the devices 600 that are connected to the I/O interface 605 include: an input unit 606, for example, a keyboard, a mouse, etc.; an output unit 607, for example, various types of displays, a loudspeaker, etc.; a storage unit 608, for example, a magnetic disk, an optical disk, etc.; and, a communication unit 609, for example, a network card, a modem, a wireless communication transceiver, etc. The communication unit 609 allows the device 600 to exchange information/data with other devices through a computer network (e.g., the Internet) and/or various telecommunications networks.

The processing unit 601 executes the methods and processing described above, for example, method 100, 200, 300 or 400. For example, in some embodiments, the method 100, 200, 300 or 400 may be implemented as computer software programs that are tangibly included in a machine-readable medium, e.g., the storage unit 608. In some embodiments, some or all of the computer programs may be loaded and/or mounted onto the device 600 via the ROM 602 and/or the communication unit 609. When the computer programs are loaded to the RAM 603 and executed by the CPU 601, one or more steps of the method 100, 200, 300 or 400 described above may be executed. Alternatively, in other embodiments, the CPU 601 may be configured to execute the method 100, 200, 300 or 400 in any other suitable ways (e.g., by means of firmware).

The functions described above may be at least partially executed by one or more hardware logic components. For example, without limitation, exemplary types of available hardware logic components include: field programmable gate arrays (FPGAs), application specific integrated circuits (ASICs), application specific standard products (ASSPs), systems on chip (SOCs), complex programmable logic devices (CPLDs), etc.

The program codes for implementing the methods of the present disclosure may be written in any combination of one or more programming languages. These program codes may be provided to the processors or controllers of general purpose computers, special purpose computers or other programmable processing apparatuses, so that the functions/operations specified in the flowcharts and/or block diagrams are implemented when the program codes are executed by the processors or controllers. The program codes may be executed entirely on a machine, executed partially on a machine, executed partially on a machine as an independent software package and partially on a remote machine, or executed entirely on a remote machine or server.

In the context of the present disclosure, the machine-readable medium may be a tangible medium, which may contain or store programs for use by or use with an instruction execution system, apparatus or device. The machine-readable medium may be a machine-readable signal medium or a machine-readable storage medium. The machine-readable medium may include, but not limited to, electronic, magnetic, optical, electromagnetic, infrared or semiconductor systems, apparatuses or device, or any suitable combination thereof. More specific examples of the machine-readable storage medium include: electrical connections based on one or more leads, portable computer disks, hard disks, random access memories (RAMS), read-only memories (ROMs), erasable programmable read-only memories (EPROMs or flash memories), optical fibers, portable compact disc read-only memories (CD-ROMs), optical storage devices, magnetic storage devices or any suitable combination thereof.

In addition, although the operations are described in a particular order, it should be understood that such operations are required to be executed in the particular order shown or in a sequential order or all illustrated operations are required to be executed to achieve the desirable result. Under certain circumstances, multitasking and parallel processing may be beneficial. Similarly, although several specific implementation details are included in the above description, these specific implementation details shall not be construed as limiting the scope of the present disclosure. Some features described in the context of separate embodiments may be implemented in a single implementation in combination. Rather, various features described in the context of a single implementation may also be implemented in multiple implementations individually or in any suitable sub-combination.

Although the subject matter has been described in a language specific to the structural features and/or the logic acts of the methods, it should be understood that the subject material defined in the appended claims is not necessarily limited to the specific features or acts described above. Rather, the specific features and acts described above are only examples of implementing the claims.

What is claimed is:

1. A method for training an SVM model, comprising steps of:

acquiring a dataset, the number of samples in the dataset being n, the dimensionality being d, both n and d being positive integers greater than 1;

loading the dataset, predicting the best storage format of the dataset online through an automatic tuning framework and performing format conversion; and comprises: calculating feature parameters of the dataset in parallel on a GPU; inputting the feature parameters into a decision tree model on a CPU to predict the best storage format of the dataset; and determining whether the best storage format is the same as the current storage format CSR; converting the current storage format into the best storage format on the GPU if the best storage format is not the same as the current storage format CSR; and, not performing format conversion if the best storage format is the same as the current storage format CSR; wherein the decision tree model is trained by the following steps: generating datasets, calculating feature set data of the datasets, and using the feature set data as training data, the training data comprising labels and feature parameters of the datasets; and generating an automatic tuning framework through a decision tree algorithm by using the training data;

executing an SMO algorithm to train an SVM model, wherein, the loading the dataset comprises:

reading and loading the dataset into a CPU memory, and storing the dataset as a dataset matrix M in a CSR format, the shape of the dataset matrix M being n*d, the executing an SMO algorithm to train an SVM model comprises:

selecting multiple pairs of Lagrange multipliers to be optimized by using a first heuristic method for multiple times to form a working set, and calculating a K_subset of a kernel matrix K and extracting K_core;

executing a local SMO solver, and solving the working set by an SMO algorithm, wherein the solving the working set by an SMO algorithm comprises finding two extreme Lagrange multipliers $\alpha$(high) and $\alpha$(low) from the working set, updating the $\alpha$(high) and $\alpha$(low), accessing the K_core, and updating a gradient vector corresponding to a subscript in the working set;

updating a global gradient vector; and determining whether a convergence condition in a global level is satisfied, indicating that the training of the SVM mode is completed if the convergence condition in the global level is satisfied, and performing iteration if the convergence condition in the global level is not satisfied;

wherein the calculating a K_subset of a kernel matrix K and extracting K_core comprises:

extracting a corresponding row from the dataset matrix M (n*d) to form a M_subset (ws_size*d), and calculating by a formula K_subset=M_subset×M' to obtain K_subset (ws_size*n), where ws_size is the size of the working set and M' is an inverse matrix of M; and extracting K_core (ws_size*ws_size) from the matrix K_subset (ws_size*n).

2. The method according to claim 1, wherein the finding two extreme Lagrange multipliers a(high) and a(low) from the working set comprises: directly performing register communication between threads by using a wrap shuffle instruction of a CUDA, so as to find two extreme Lagrange multipliers a(high) and a(low) from the working set.

3. An identification method based on an SVM model, comprising steps of:

acquiring a dataset to be identified;

loading the dataset to be identified, predicting the best storage format of the dataset online through an automatic tuning framework, and performing format conversion; and comprises: calculating feature parameters of the dataset in parallel on a GPU; inputting the feature parameters into a decision tree model on a CPU to predict the best storage format of the dataset; and determining whether the best storage format is the same as the current storage format CSR; converting the current storage format into the best storage format on the GPU if the best storage format is not the same as the current storage format CSR; and, not performing format conversion if the best storage format is the same as the current storage format CSR; wherein the decision tree model is trained by the following steps: generating datasets, calculating feature set data of the datasets, and using the feature set data as training data, the training data comprising labels and feature parameters of the datasets; and generating an automatic tuning framework through a decision tree algorithm by using the training data;

identifying the dataset by using the SVM model trained by the method comprising steps of:

acquiring a dataset, the number of samples in the dataset being n, the dimensionality being d, both n and d being positive integers greater than 1;

loading the dataset, predicting the best storage format of the dataset online through an automatic tuning framework and performing format conversion; and comprises: calculating feature parameters of the dataset in parallel on a GPU; inputting the feature parameters into a decision tree model on a CPU to predict the best storage format of the dataset; and determining whether the best storage format is the same as the current storage format CSR; converting the current storage format into the best storage format on the GPU if the best storage format is not the same as the current storage format CSR; and, not performing format conversion if the best storage format is the same as the current storage format CSR; wherein the decision tree model is trained by the following steps: generating datasets, calculating feature set data of the datasets and using the feature set data as training data, the training data comprising labels and feature parameters of the datasets; and generating an automatic tuning framework through a decision tree algorithm by using the training data;

executing an SMO algorithm to train an SVM model, wherein, the loading the dataset comprises:

reading and loading the dataset into a CPU memory, and storing the dataset as a dataset matrix M in a CSR format, the shape of the dataset matrix M being n*d, the executing an SMO algorithm to train an SVM model comprises:

selecting multiple pairs of Lagrange multipliers to be optimized by using a first heuristic method for multiple times to form a working set, and calculating a K_subset of a kernel matrix K and extracting K_core;

executing a local SMO solver, and solving the working set by an SMO algorithm, wherein the solving the working set by an SMO algorithm comprises finding two extreme Lagrange multipliers α(high) and α(low) from the working set, updating the α(high) and α(low), accessing the K_core, and updating a gradient vector corresponding to a subscript in the working set;

updating a global gradient vector; and determining whether a convergence condition in a global level is satisfied, indicating that the training of the SVM mode is completed if the convergence condition in the global level is satisfied, and performing iteration if the convergence condition in the global level is not satisfied;

wherein the calculating a K_subset of a kernel matrix K and extracting K_core comprises:

extracting a corresponding row from the dataset matrix M (n*d) to form a M_subset (ws_size*d), and calculating by a formula K_subset=M_subset×M' to obtain K_subset (ws_size*n), where ws_size is the size of the working set and M' is an inverse matrix of M; and extracting K_core (ws_size*ws_size) from the matrix K_subset (ws_size*n), wherein the finding two extreme Lagrange multipliers α(high) and α(low) from the working set comprises:

directly performing register communication between threads by using a wrap shuffle instruction of a CUDA, so as to find two extreme Lagrange multipliers α(high) and α(low) from the working set.

4. An electronic device, comprising a memory and a processor, the memory storing computer programs, wherein the processor implements the method according to claim 1 when executing the programs.

5. A non-transitory computer-readable storage medium storing computer programs that, when executed by a processor, implement the method according to claim 1.

* * * * *